Patented Sept. 7, 1948

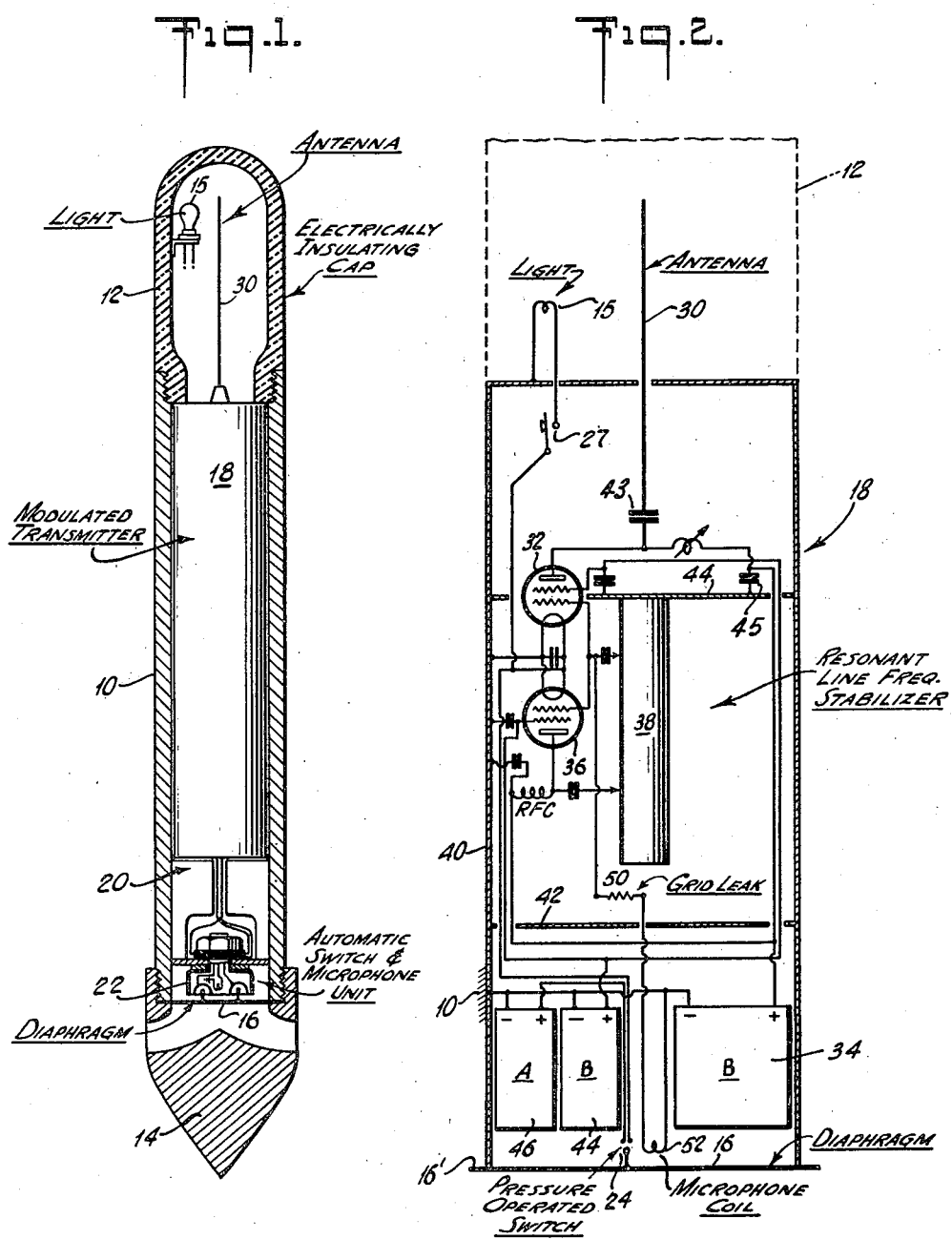

2,448,713

UNITED STATES PATENT OFFICE 2,448,713

RADIO LISTENING BUOY

Clarence W. Hansell, Port Jefferson, N. Y., assignor to Radio Corporation of America, a corporation of Delaware Application December 2, 1944, Serial No. 566,321

15 Claims. (Cl. 177—386)

1

This application refers to means for listening, at a remote point, to sound waves and the like, arising in an area to be investigated.

In a particular application the means of the invention makes it possible to listen, at a remote point, to sound waves and similar disturbances arising in an area wherein direct listening and listening in other manners, except for my means, would be impossible.

Such means is obviously of wide use throughout the radio and allied fields, and is of particular interest in war, being useful, as will appear more in detail hereinafter, both in taking defensive and offensive action against the enemy.

One might say then, a general and broad object of my invention is listening in on noise waves or similar waves initiated in an area to be investigated and doing this from a remote point.

To attain the general object outlined above, I provide sound or similar wave energy sending means which may be placed in any desired area (safe or unsafe), and the signals observed at a remote point to give the observer information as to what is taking place in the said area. More specifically, in accordance with my invention small battery operated phase or frequency modulated ultra high frequency radio transmitters are provided in the form of a small portable package which may be placed in the area to be investigated in order to relay sounds arising in said area automatically to a distance where they may be heard and the information gained thereby used by observers.

A few typical examples of use for my invention will now be given.

In dealing with hostile submarines which are submerged and not visible from the surface the most effective means to detect their presence and to then deal with them is to listen to the sound which they make in the water. The sound listening apparatus is usually located below water on the hull of a ship, and in listening through this apparatus for a submarine one of the outstanding difficulties is that the observer's own ship or vessel makes so much noise under way, and sometimes even at rest, that the listening range is quite limited. At rest the listening range is greatly extended, and therefore the vessel must stop to listen. The submarine may then also be at rest to evade detection and the vessel in search thereof is obliged to stand by and try to "wait out" the submarine. This, of course, is very dangerous because the submarine may be located in a position at which it may take offensive action against the vessel in search thereof.

2

To overcome this difficulty my small sound relaying radio buoys may be dropped in suspected areas from surface vessels or planes. The radio buoys then automatically relay sounds arising in this area to receivers at a distance. By employing several buoys judiciously located in the area or even scattered at random in the area, a fairly good aural picture of what is taking place therein may be obtained by observing the relative strengths of modulation of the various buoys and spotting their positions.

For such use I propose that the bearings of the radio buoys be obtained by radio direction finding, and by visual observation and range finding. To facilitate visual observation at night I propose to include a small electric light in the upper part of each buoy, this light to be turned on automatically when the radio transmitter is turned on. Thus a plane or surface vessel in contact with the radio buoys may locate a concealed submarine with considerable accuracy and follow its movements without exposing itself to attack in doing so. Once the submarine is located appropriate action may be taken, such as the dropping of depth charges. Furthermore, the radio buoys, either floating or anchored, may be employed to keep watch over this area or any other area for a considerable time to prevent escape of the submarine "by playing possum." In other words, the radio buoys can "wait out" the submarine.

In guarding harbors, convoys, vessels in distress, coast lines threatened with invasion, etc., radio buoys may be dropped around areas needing protection and the approach of submarines or surface vessels will be heard and their directions of approach, location, etc., automatically relayed to listening stations. The radio buoys will, it is believed, be extremely useful for emergency protection, for guarding convoys, etc., because they may be dropped into the water ahead of and around the convoy where they will maintain a continuous watch for movement of invisible submarines. After the convoy has passed, the radio buoys may be retrieved by the convoying warships, such as destroyers, and again placed ahead of and around the convoy. Once a submarine is heard it may be quickly and quite accurately located by dropping as many additional buoys as may be needed to obtain any required accuracy.

Similar small radio sound relaying transmitters may be planted around troop concentrations, supply depots, dropped in the path of enemy troops, etc., to give warning and to relay useful information. They may also be used in intelligence work, to overhear enemy agents' conversations, etc.

While it is believed that the nature of my invention will be clear to those skilled in the art from the above description thereof, I have shown in the drawings an embodiment thereof.

In the drawings,

Fig. 1 illustrates a radio buoy comprising a closure member which provides buoyancy for itself, and a radio transmitter including sending means, power sources, a microphone, and operating means therefor.

Fig. 2 illustrates schematically a transmitter arrangement suitable for inclusion within the closure member of the radio buoy of Fig. 1.

In Fig. 1, 10 is a metallic closure member such as for example, tubing having a circular or rectangular cross-section. In the description which follows it will be assumed the tubing is circular in cross-section, although, as stated above, it may have another form in which case other means for assembling the same is provided. The tube 10 has its inner periphery recessed and threaded at one end to receive a closure member 12, which is preferably of plastic molded material, and which may be readily removed to assemble or recondition the equipment by supplying new batteries, etc.

The insulating plastic cap 12 may, if desired, be brightly colored to facilitate observation by the user and location thereof. The color of the cap may also be coded, each color to correspond to a particular operating frequency range to facilitate coordinating radio and visual bearing readings and distances to the buoy. This facilitates use of the same from planes as well as surface vessels. For use at night, as previously stated, each buoy may be equipped with an electric light 15, shown in the drawings, to facilitate visual observation. These lights may shine through translucent color coded caps to facilitate identification.

Of course, if the buoys are to be used in a position where one does not want the enemy to be able to locate the same readily, a color similar to the surrounding area, or a translucent material, is used for the plastic member 12. This cap member 12 in the embodiment illustrated, is sealed on to the member 10, and provides room for the transmitter antenna.

The other end of the metallic member 10 is also threaded on its outer periphery and a relatively heavy metallic point member 14 is threaded thereon. The member 14 has several purposes, one of which is to make the radio buoy float with the plastic member 12 up and to retain in position a sound diaphragm 16, which is retained between the threaded members 14 and 10, being pressed between the end of the member 10 and a shoulder of the member 14. The closure member 14 with the diaphragm 16 likewise seals the radio buoy to prevent entry of water therein. The member 14 may also have openings therein to permit sound waves traveling in the water to reach the diaphragm 16. The heavy member 14 also affords protection for the diaphragm and apparatus when the unit is dropped from a plane or similarly used.

The main body of the member 10 includes the transmitter 18, the operating sources 20 therefor, the microphone shown schematically at 22, and a switch 24 (Fig. 2) which is pressure operated to close the filament heating circuit for the tubes in the transmitter 18. When a light 15 is to be included and/or used in the equipment the same may be energized by the supply source for the radio, the circuit of which is closed by switch 24. A switch 27 may be included in the light circuit.

If the transmitter in the buoy operates on a frequency near 300 megacycles, then the buoy may be as short as say 30 inches, and may float with 12 to 18 inches of its length submerged. In general, the buoys which are to be distributed and utilized by surface vessels may be longer, heavier and operate on lower frequencies than the buoys to be dropped from airplanes.

The transmitter per se may take various forms, and in Fig. 2 I have shown by schematic diagram a preferred form of the electrical circuits of the buoy. This arrangement is disposed for ease of assembly and for ease of insertion in the member 10. The transmitter comprises an antenna 30 coupled by capacity to the anode of an amplifier tube 32. This amplifier tube and the oscillator tube 36 get their anode potential from a source 34 located in the lower end of the member 10 below the transmitter circuits. The amplifier tube 32 has its control grid coupled to one end of an oscillation generating circuit including tube 36. The tube 36 has its grid and anode coupled to spaced points on the inner member 38 of a resonant line the length of which determines the frequency of the oscillations generated. Oscillations are generated in accordance with the principles used in the Hartley oscillator.

The resonant line has an inner member 38 to which the grid and anode of tube 36 may be adjustably coupled and an outer member 40 which may be the metallic member 10 or a separate member, inclosing the tubes and circuits if desired, in contact with the member 10. The line has a closure member 42 at one end, and a closure member 44 at the other end. The outer member of the line is considered ground as usual in the radio circuit. The screen grids of both tubes are supplied by potential through leads connected to the positive terminal of a source 44, the negative terminal of which is connected to the grounded member 40. The filaments of both tubes are connected at one side to the member 40, and at the other side to a terminal of the filament battery 46, the other terminal of which is also connected to the member 40. Note that this last connection is by way of a switch 24, pressure operated by floating the radio buoy in water. The switch 24 is shown as being operated by the diaphragm 16 of the microphone. It may be operated by other pressure operated means, if preferable. The control grids of both tubes are coupled by a grid leak resistance 50 and a microphone coil 52 to ground or the tube filaments. When the diaphragm 16 is operated by sound waves traveling from the enemy submarine or other source, the value of the current through the grid circuit including resistance 50 is varied. This varies the bias on the tubes in a manner to modulate the grid impedances, thereby in turn modulating the frequency of the oscillations generated. The oscillations generated in tube 36 and amplified in tube 32 are as a consequence frequency modulated in both tubes in accordance with any wave disturbances of sufficient strength to actuate diaphragm 16.

The diaphragm 16 in Fig. 2 is shown as being integral with the member 40. When this arrangement is used, other steps are taken to seal the lower end of the apparatus. For example, the diaphragm 16 then may have an extended periphery at 16' which is clamped between the members 10 and 14 of the buoy so that the diaphragm seals the lower end of the radio buoy, and properly positions the radio apparatus in the member 10. It operates as a pressure switch to close the filament heating circuits and then serves as the moving element of the frequency or phase modulator.

The transmitter circuit per se includes several bypassing and coupling condensers not described. The use of these condensers is well known in the art. A choking inductance is included between the anode of tube 36 and the source 34 to block high frequency currents.

A desirable feature of the circuits is that the pressure on the flexible diaphragm can produce no steady state frequency shifts but can only produce dynamic frequency modulations. The arrangement automatically emphasizes the higher frequencies to make the unit tend to produce the equivalent of wide band phase modulation when the sounds are strong.

This is accomplished by using a microphone of the type in which the sound wave vibrations move a coil in an intense field of a permanent magnet. Alternatively a carbon type microphone, supplied with current from the filament battery may be coupled to the radio transmitter through a transformer with insulated primary and secondary windings. In this latter case the entire microphone unit may be supported on the diaphragm 16 so that it will ride up and down with it. Then by coupling one side of the microphone rigidly and the other elastically to the diaphragm the mass of the elastically mounted part will serve to give increasing response with increasing frequency of the sound.

In receiving sound relayed by the buoys it may be expected that the strength of received currents often will vary over quite a large range due to water wave action. For this reason limiting and fast automatic carrier volume control will usually be employed at the receiver. With a properly operated receiver the output of sound will be independent of received signal strength over a very large range.

The degree of frequency swing will provide a direct measure of the strength of sound at each buoy, which provides a means to make a close approximation to the relative distances from buoys to the source of sound. Three buoys are therefore theoretically sufficient to locate a submarine with considerable accuracy.

It is believed that radio buoys can be made sufficiently rugged to withstand shooting to considerable distances from catapults or guns. This would be a considerable aid to surface vessels searching for submarines, or seeking to escape them. It would also be an aid in obtaining information from enemy areas on the ground.

What is claimed is:

1. In signalling apparatus, a buoyant container adapted to be free floated in fluid during operation, a portion of said container being resilient and capable of movement under pressure, wave energy generating apparatus and transmitting apparatus coupled thereto, said generating apparatus and transmitting apparatus being located within said container, said apparatus including a circuit having at least one contact to be closed, a contact closing member linked to said resilient portion of said container and positioned to close said contact when the container is placed in fluid which applies pressure to said resilient portion and a pressure responsive modulator including said resilient portion connected to aforesaid apparatus for modulating the generated wave energy.

2. In signalling apparatus, a buoyant container adapted to be free floated in fluid during operation, a portion of said container being capable of movement under pressure, a radio transmitter in said container, said transmitter including tubes having cathodes and a heating circuit therefor, at least one contact in said heating circuit to be closed to put said transmitter in operation, a link between said contact and said portion of said container and positioned to close said contact when the container is placed in fluid and pressure is applied to said portion and a pressure responsive modulator connected to said radio transmitter for modulating the generated wave energy.

3. In signalling apparatus, a buoyant container adapted to be floated in fluid during operation, a portion of said container being resilient and capable of movement under pressure, signalling circuits including wave modulating means in said container, a switch in one of said circuits which when closed puts said signalling means in operation, an operating link between said switch and said resilient portion of said container to close said switch when the container is placed in fluid and pressure applied to said resilient portion, and means for actuating the said modulating means in accordance with wave energy striking said resilient portion.

4. In combination, a transmitter housing comprising a buoyant body member enclosing a transmitting system including a circuit, a switch in said circuit which when closed puts said transmitting system in operation, a diaphragm forming a wall of said housing, a coupling between said diaphragm and said transmitter for modulating the transmitting system in accordance with sound waves striking said diaphragm, a link coupling said diaphragm to said switch to close the same when said housing is floated in fluid, and radiating means in said housing forming part of said transmitting system.

5. In combination, a free floating buoyant radiant energy transmitter housing comprising a body member enclosing an electromagnetic wave generator and magnetic wave radiator, a diaphragm forming a wall of said container so that the same is exposed to sound waves when the container is floated in fluid, and a winding associated with said diaphragm and said wave generator for modulating the generated waves in accordance with wave energy striking said diaphragm.

6. In apparatus of the nature described, a radiant energy transmitter including wave generating, wave modulating and wave radiating means, a power supply for said transmitter in a circuit including a switch which when closed energizes the transmitter, and a housing for enclosing said transmitter comprising a rigid metallic portion, a resilient metallic portion which serves as the microphone diaphragm for modulating the transmitter, a non-metallic portion in which the radiating means is located, said housing and transmitter being arranged to be placed in operation by dropping the same in the desired area, apparatus for closing said switch when said transmitter housing is dropped and a heavy recessed protective member fixed to said housing in a position to protect said resilient metallic portion.

7. In combination, a radiant energy transmitter container comprising a metallic portion enclosing a wave generator and a non-metallic portion enclosing a wave radiator, a diaphragm forming a wall of said container so that the same is exposed to sound waves, a protective member for said diaphragm, a winding having an electric field, when energized, which is cut by said diaphragm and a coupling between said winding and said wave generator for modulating the generated waves in accordance with wave energy striking said diaphragm.

8. In a signalling system, a housing including a non-metallic portion, a rigid metallic portion and a resilient metallic portion, wave generating means in said housing, said generating means including a tube and a high frequency resonant circuit including said rigid metallic portion, a microphone for modulating said generator, said microphone including said resilient portion as a diaphragm, a protective member for said diaphragm, and radiating means located in said non-metallic portion and coupled to said wave generating means.

9. A radio listening buoy to be dropped in the water for picking up sound waves in the water and relaying them by radio to a distant station comprising a container for a radio transmitter, protected and weighted at one end by a relatively heavy member, and closed at the other end by a sealed cover which contains a radiator and which is transparent to radio waves, and a sound wave operated diaphragm in said container protected by said heavy member and arranged to modulate said radio transmitter.

10. A plurality of buoys as recited in claim 9, having covers of different colors each color being coordinated with a particular narrow range of radio frequencies for transmission.

11. A radio buoy according to claim 9, wherein a light is enclosed within the sealed cover to permit visual observation and location of the buoy at night.

12. In signalling apparatus a buoyant container adapted to be floated in fluid during operation, said container comprising a rigid metallic section, a resilient metallic section and a non-metallic section, a heavy protective member for said resilient portion, there being openings in said protective member to permit sound waves to reach said resilient portion, a transmitter including at least one electron discharge device enclosed in said metallic portion, means for generating oscillatory energy including said one device having its electrodes coupled in a resonant oscillation generating circuit, said resonant circuit including a conductor within said container which with said metallic portion of said container forms a resonant line, a wave energy radiator coupled to said oscillation generator and enclosed within said non-metallic portion, modulating means associated with said resilient portion and with said device for modulating the wave energy generated in accordance with sound waves reaching said resilient portion through said openings in said protective portion, and a power supply source and circuit for said device including a switch closed by pressure on said resilient portion of said container when the same is floated.

13. In signalling apparatus a buoyant container adapted to be floated in fluid during operation, said container being somewhat cylindrical in shape and comprising a resilient metallic portion, a rigid metallic portion, and a non-metallic portion, a heavy protective member for said resilient portion, there being openings in said protective member to permit sound waves to reach said resilient member, a transmitter including at least one electron discharge device enclosed in said metallic portion, means for generating oscillatory energy including said one device with its electrodes coupled in a resonant oscillation generating circuit, a conductor which with said resonant circuit including a metallic portion forms a coaxial line, a metal shield member joining the coaxial lines at adjacent ends and separating said rigid metallic portion from said non-metallic portion, a wave energy radiator coupled to said oscillation generator and enclosed within said non-metallic portion, modulating means actuated by movement of said resilient portion and associated with said device for modulating the wave energy generated in accordance with sound waves reaching said resilient portion through said openings in said protective portion, and a power supply source and circuit for said device including a switch closed by movement of said resilient portion of said container when the same is placed in fluid.

14. A radio transmitter structure to be dropped from aircraft in an area for investigating sound vibrations and the like arising therein comprising, a closure member, a radio wave generator and modulator in said container, said container being, protected and weighted at one end by a heavy body portion, and closed at the other end by a cover which contains an antenna, said cover being transparent to radio waves, a sound wave pick-up device in said container protected by said heavy body portion, and a coupling between said pick-up device and said radio wave generator.

15. A radio listening buoy to be dropped in the water for picking up sound waves in the water and relaying them by radio to a distant station comprising a container for a radio transmitter protected and weighted at one end by a relatively heavy member, and closed at the other end by a sealed cover which contains a radiator and which is transparent to radiated waves, said relatively heavy member being recessed, a sound wave operated diaphragm in said container adjacent said recess for protection by said heavy member for operation by sound waves passing through said recess to modulate said radio transmitter, said relatively heavy member being arranged to protect said diaphragm from mechanical damage which might result from said buoy being distributed for use.

CLARENCE W. HANSELL.

REFERENCES CITED

The following references are of record in the file of this patent:

UNITED STATES PATENTS

| Number | Name | Date |
|---|---|---|
| 1,426,337 | Sperry | Aug. 15, 1922 |
| 1,877,079 | Sturgis | Sept. 13, 1932 |
| 1,928,408 | Clavier | Sept. 26, 1933 |
| 2,071,311 | Linder | Feb. 16, 1937 |
| 2,107,387 | Potter | Feb. 8, 1938 |
| 2,125,969 | Turner | Aug. 9, 1938 |
| 2,253,589 | Southworth | Aug. 26, 1941 |
| 2,310,017 | Canon et al. | Feb. 2, 1943 |
| 2,311,491 | Turner | Feb. 16, 1943 |
| 2,323,064 | Lustfield | June 29, 1943 |
| 2,361,177 | Chilowsky | Oct. 24, 1944 |
| 2,368,663 | Kandoian | Feb. 6, 1945 |

FOREIGN PATENTS

| Number | Country | Date |
|---|---|---|
| 335,125 | Italy | Feb. 1, 1936 |